United States Patent [19]

Gessert

[11] 4,428,059
[45] Jan. 24, 1984

[54] REAL TIME FILL CIRCUIT

[75] Inventor: James M. Gessert, Evergreen, Colo.

[73] Assignee: Honeywell Inc., Minneapolis, Minn.

[21] Appl. No.: 411,398

[22] Filed: Aug. 25, 1982

Related U.S. Application Data

[63] Continuation of Ser. No. 173,874, Jul. 30, 1980, abandoned.

[51] Int. Cl.³ .................. G06F 15/20; G06F 15/42
[52] U.S. Cl. .................................. 364/577; 364/414; 364/723
[58] Field of Search ............... 364/414, 577, 723; 358/133, 160, 166, 280, 284; 378/901

[56] References Cited

U.S. PATENT DOCUMENTS

| | | | |
|---|---|---|---|
| 3,846,625 | 11/1974 | Sasayama | 364/723 |
| 3,924,129 | 12/1975 | Le May | 378/901 X |
| 4,001,565 | 1/1977 | Kawai | 364/723 |
| 4,002,910 | 1/1977 | Le May | 378/901 X |
| 4,135,247 | 1/1979 | Gordon et al. | 364/414 |
| 4,136,388 | 1/1979 | Lindquist | 364/414 |
| 4,144,570 | 3/1979 | Wagner | 364/414 |
| 4,193,092 | 3/1980 | Stoffel | 358/133 X |
| 4,231,097 | 10/1980 | Shibayama et al. | 364/723 X |
| 4,233,662 | 11/1980 | Le May | 378/901 X |

FOREIGN PATENT DOCUMENTS

| | | |
|---|---|---|
| 2227582 | 11/1974 | France . |
| 2278310 | 2/1976 | France . |
| 1471531 | 4/1977 | United Kingdom . |
| 1515307 | 6/1978 | United Kingdom . |
| 2010545 | 6/1979 | United Kingdom . |

OTHER PUBLICATIONS

Abdou et al.: Fast Nearest Neighbor 2-Dimensional Interpolation Method for Imaging Devices of Dissimilar Resolution.
IBM Technical Disclosure Bulletin, vol. 22, No. 4, Sep. 1979, pp. 1649-1651.

Primary Examiner—Felix D. Gruber
Attorney, Agent, or Firm—Charles J. Ungemach

[57] ABSTRACT

There has been provided, a digital circuit for interpolating the intensity values between adjacent pulsed data signals. The interpolation includes, effectively, providing a plurality of shades of gray between adjacent received data. The interpolation data is applied to the display means to effectively fill the interstices between the adjacent image lines. When thus applied, the resultant image is one of a smooth transition between adjacent analog data thereby constituting a more readily readable and desirable display of the image.

10 Claims, 4 Drawing Figures

REAL TIME FILL CIRCUIT

This is a continuation of application Ser. No. 173,874 filed July 30, 1980 now abandoned.

BACKGROUND OF THE INVENTION

The present invention relates to non-incursive diagnostic apparatus. More particularly, it relates to image display and recording means for such diagnostic apparatus.

In the art relating to diagnostics, especially in the field of medical diagnostics, means have been provided for examining the interior of a body by measuring the intensity of energy reflected from body members or transmitted through body members. One preferred form of such examination is by the use of ultrasonic pulse energy transmitted into the body member by a scanning transducer, with the sonic energy being reflected by elements within the body and received by the same or similar transducer. In the case of such an ultrasonic scanning system, the body portions examined comprise a fan shaped sector covering for example, an angle of 30 to 75 degrees. The reconstructed image, when displayed, also presents a representation covering an angle of the same 30 to 75 degrees. The width of the angle is a function of the desired scanning angle of the transducer. The display appears as an array of radial lines with each line having portions of variable density depending upon the intensity of the reflected signal. It will be appreciated that, the wider the scan of the transducer, the greater will be the separation between adjacent radial lines. The number of radial lines is a function of the pulse repetition rate of the initiating sonic pulses and the scan frequency of the transducer. In one such system, the relationship was such as to produce 100 radial lines per scan. While the discrete radial lines are adequate to convey the desired medical information to a trained observer, the gaps, or spaces, between the discrete lines presents an undesirable image pattern which is difficult to read.

SUMMARY OF THE INVENTION

It is, accordingly, an object of the present invention to provide an improved image display means.

It is another object of the present invention to provide means for effecting an improved display of pulsed image data.

In accomplishing these and other objects, there has been provided, in accordance with the present invention, a digital circuit for interpolating the intensity values between adjacent pulsed data signals. The interpolation includes, effectively, providing a plurality of shades of gray between adjacent received data. The interpolation data is applied to the display means to effectively fill the interstices between the adjacent image lines. When thus applied, the resultant image is one of a smooth transition between adjacent analog data thereby constituting a more readily readable and desirable display of the image.

BRIEF DESCRIPTION OF THE DRAWINGS

A better understanding of the present invention may be had from the following detailed description when read in the light of the accompanying drawings, in which.

DETAILED DESCRIPTION

Figure 1:
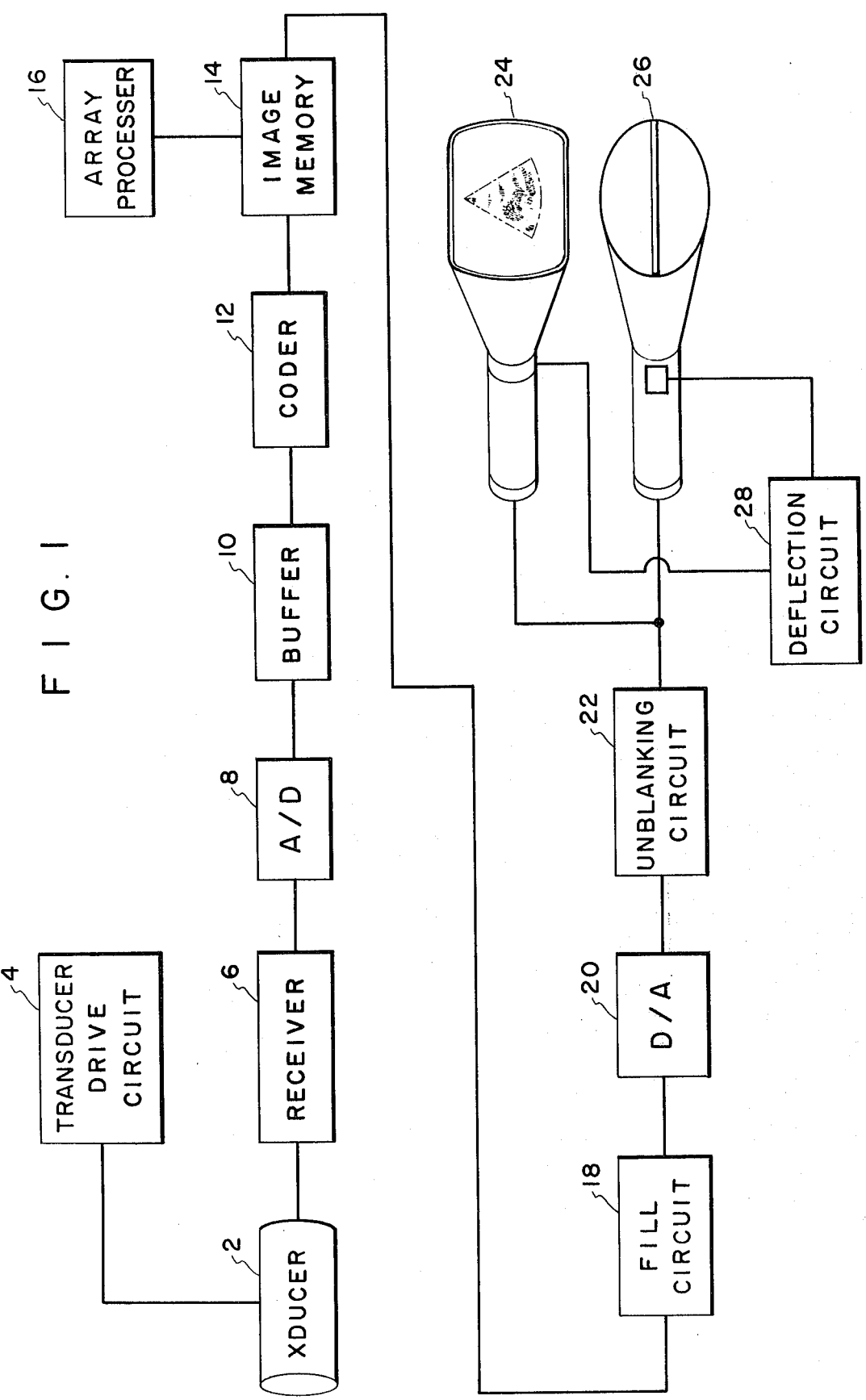
FIG. 1 is a schematic block diagram of a image data display and recording system incorporating the present invention.

Referring now to the drawings in more detail, there is shown in FIG. 1 a diagram of a system embodying the present invention. Specifically, there is shown a transducer 2. The transducer 2 is driven to produce series of ultrasonic pulses by a transducer drive circuit 4. The drive circuit 4 is of conventional and well-known design. The sonic signals reflected from the body are detected by the transducer 2 and converted to corresponding electrical signals varying in amplitude with the intensity of the reflected signals. These electrical signals are applied to the input of a receiver 6 for amplification. The output of the receiver 6 is applied to the input of an analog-to-digital (A to D) converter 8. The output of the analog-to-digital converter 8 is applied to the input of a line buffer 10, the output of which is, in turn, applied to the input of a coder 12. The coder puts the digital data from the buffer into a preferred form for storage in an image memory 14. The image memory 14 is, in turn, controlled by an array processor 16 which is programmed to store the data in the memory in a pattern corresponding to the scan sector of the transducer.

The output of the image memory is applied to the input of a fill circuit, or interpolator, 18. The fill circuit or interpolator 18 will be discussed in greater detail hereinafter. The output of the fill circuit 18 is applied to the input of a digital-to-analog (D to A) converter 20, the output of which is applied to the input of an unblanking circuit 22. The unblanking circuit 22 controls the beam intensity or Z axis modulation of a display CRT 24 and of a recording CRT 26. A suitable deflection circuit 28 controls the deflection of the beam in each of the CRT's 24 and 26. In the case of the display CRT 24, the deflection circuit 28 controls the X and Y axis deflection of the beam, while in the recording CRT 26, it is essentially the X axis deflection that is controlled. The recording CRT is preferably of the type having a narrow band of fiber optic elements across the face plate thereof to define a recording area.

In operation the transducer driver circuit 4 energizes the transducer 2 to produce a series of ultrasonic pulses which are radiated into the body to be examined. A portion of the pulse energy is returned to the transducer 2 by reflection from organic structures within the body under examination in accordance with known technology. The energy received by the transducer is converted to corresponding analog electrical signals which are received and amplified by the receiver 6. The amplified analog signals are converted to corresponding digital values by the analog-to-digital converter 8. The digital data corresponding to the analog signals is assembled in the buffer 10 and then passed through the coder 12, (more about which will be said hereinafter) to be stored in the image memory 14. The array processor 16 associated with the image memory 14 is coordinated with the scanning angle of the transducer 2 and controls the addressing of the data into the image memory in a pattern to correspond to the scanning angle of the transducer. The stored data is then read from the image memory 14 on a line-by-line, or raster scan basis and applied to the input of the fill or interpolation circuit 18.

In a preferred embodiment, the fill circuit 18 may be selectively included in the circuit or bypassed. The digital data is then supplied to the digital-to-analog converter 20 where the digital values are reconverted to analog signals and applied as Z axis modulation to the unblanking circuit 22 for either or both of the two CRT devices 24 and 26. The display presented on the face of the CRT 24 will be in the form of a sector display corresponding to the angular scan of the transducer, with the analog signal appearing as areas as variable density within the scan sector. It is anticipated that a photosensitive recording medium will be moved at a predetermined speed past the face of the recording CRT 26 in accordance with known techniques. The resulting image on the recording medium would, again, be in the form of a sector display coresponding to the angular scan of the transducer 2 with the analog data appearing as areas of variable density within that scan sector.

Figure 3:
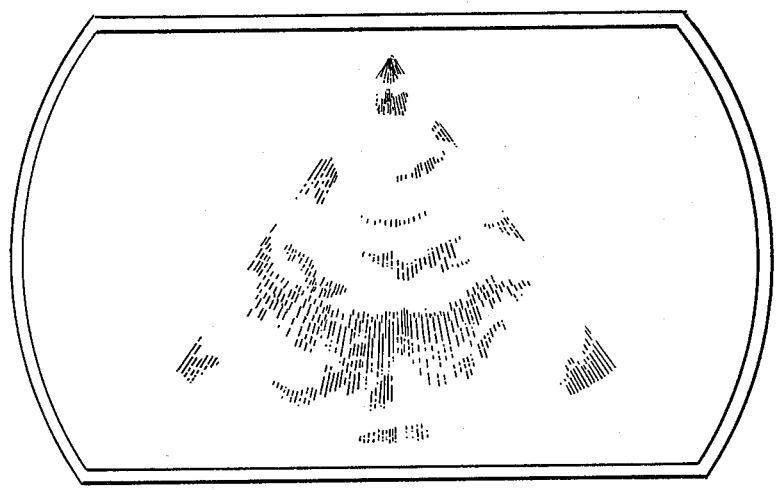
FIG. 3 is a pictorial representation of an image produced without the benefit of the present invention.
Figure 4:
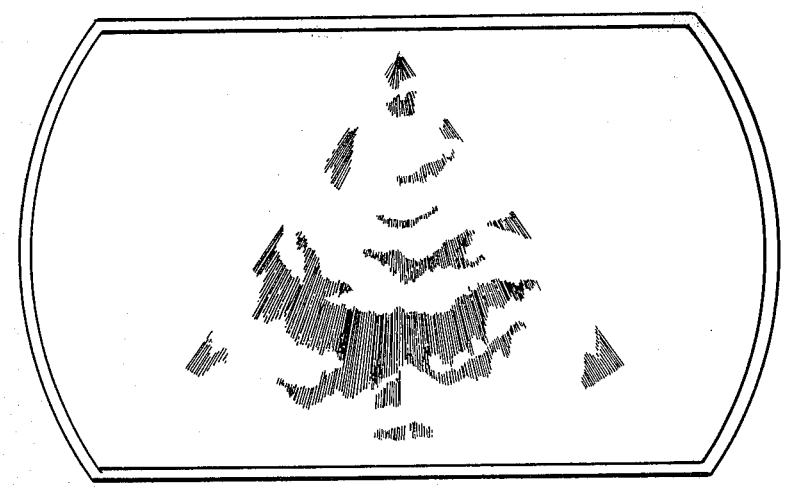
FIG. 4 is a pictorial representation of an image produced using the present invention.

As was previously noted, without the use of the fill circuit, the image appearing both on the display tube 24 and on a record made from the recording CRT 26, will be in the form of a succession of laterally disconnected dots arranged as an array of radial lines, such as is shown in FIG. 3. On the other hand, when the fill circuit or interpolation circuit 18 is connected in use, the image on the face of the display CRT 24 and on the record formed from the recording CRT 26 will appear with the laterally disconnected dots now connected by interpolated shades of gray to produce a smoother image such as that shown in FIG. 4. As may be seen from a comparison of FIGS. 3 and 4, the recorded data in FIG. 3 appears as a number of radial lines each spaced from the next adjacent line with the data appearing as variable density marks representing the individual data units. In FIG. 4, however, there has been an interpolation of data between the distinct radial lines to fill in appropriate data to provide the smoother image pattern.

In the accomplishment of the interpolation, it is desirable that no interpolation or fill be spread into true zero areas, such, for example, as beyond the edges of the fan shaped sector. In accordance with a system constructed in accordance with the present invention, the A to D converter 8 converts the analog information into four bit data words representing 16 shades of gray, or digital values from zero to 15. In order to avoid spilling the interpolation over into the non-data portions of the display, i.e., beyond the edges of the fan shaped sector, the coder 12, in FIG. 1, forces all of the words of value zero in the significant data stream to become words of value one. This conversion, of course, applies only to the data received from the transducer and transmitted through the A to D converter to the coder 12. This arrangement provides for a positive distinction between image data and true zero or background data. Thus the data stored in the image memory 14 in the pattern of the fan shaped sector will range in value between 1 and 15 whereas the data surrounding the fan shaped image will be all logical zeros. Similarly, the memory data cells or pixels between the radial lines of data in the image memory will also be logical zeros or data spaces. The data stored in the image memory is read out in a line by line or raster scan and applied to the input of the fill circuit 18, as shown in FIG. 1.

Figure 2:
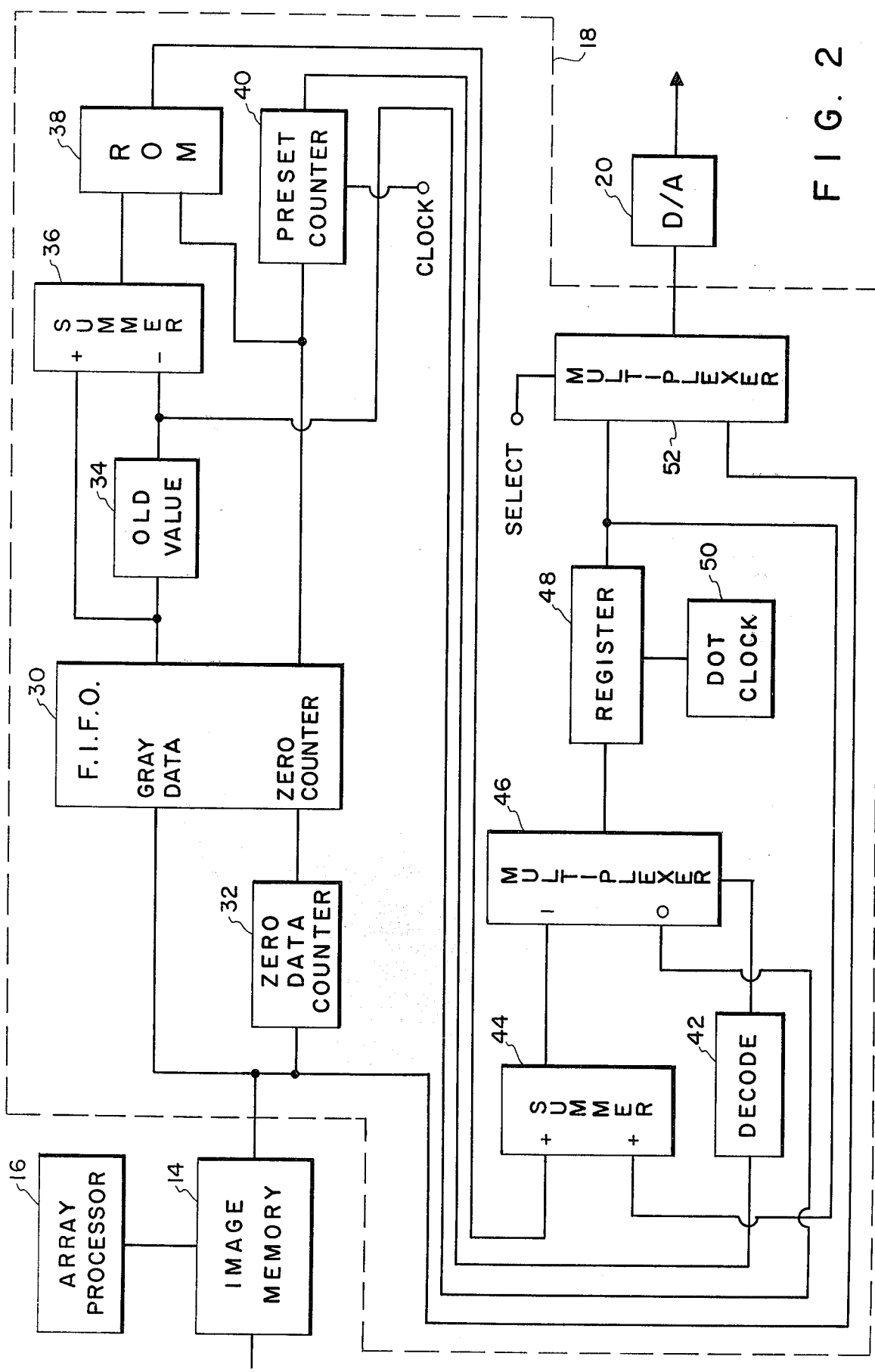
FIG. 2 is a schematic block diagram of a circuit embodying the present invention, and comprises one portion of the system shown in FIG. 1.

The fill circuit 18 is shown in greater detail in FIG. 2. The input terminal of the fill circuit 18 is connected first to a gray data input of a first-in first-out (FIFO) memory unit 30. The output of the image memory 14 is also applied to the input of a zero data or data space counter circuit 32 which includes a detector to detect the data spaces as well as a counter to count them. The output of the zero data counter 32 is applied to a second input of the memory unit 30. The FIFO memory unit 30 may, in practice, be formed of two or more memory chips such as those designated as 74S225 produced by Texas Instruments. The zero data counter 32 includes means for detecting the number of zero data units between adjacent non-zero data units. The count thus generated is stored in the one portion of the FIFO memory unit 30. In the other portion of the FIFO memory unit 30 the non-zero data units, representative of the intensity of the signal produced by the transducer in response to the reflected sonic energy, is stored. That intensity responsive data will be hereinafter referred to as gray data. The output gray data from the FIFO 30 is applied to the input of an old value register 34, the output of which is applied to one input terminal of an adder or summer 36. The gray data output of the FIFO 30 is also applied directly to a second input of the summer 36. The summer 36 provides an output signal which is representative of the digital difference between the old value or the immediately preceding value of the gray data and the current value of the gray data.

The output of the summer 36 is applied as one input to a Read Only Memory (ROM) unit 38. The zero count output of the FIFO memory unit 38 is applied as a second input to the ROM 38. The two input circuits to the ROM 38 effectively comprise address signals for the unit 38. Values which were previously stored in the ROM 38 are such that the output signal from the ROM 38 comprises a fraction signal which is representative of the difference signal from the summer 36 divided by a number representative of the zero count, plus one. This relationship will be set forth more fully hereinafter.

The zero count from the FIFO memory unit 30 is also applied as an input signal to a preset counter 40. The output of the counter 40 is applied as an input signal to a decode circuit 42. The output signals from the ROM 38 are applied as a first input signal to a second summing circuit 44. The output of the summer 44 is applied to one input of a multiplexer 46. The second input to the multiplexer 46 is connected to the output of the old value register 34. The output of the decode circuit 42 is connected to control the selective operation of the multiplexer 46.

The output of the multiplexer 46 is applied as an input signal to a buffer register 48 which is controlled by a dot clock circuit 50. The output of the register 48 is connected to the second input of the summer circuit 44. The output of the register 48 is also applied as one input signal to an output selector multiplexer 52. A second input of the multiplexer 52 is connected to the output of the image memory 14. The output of the multiplexer 52 is applied to the input of the digital to analog converter 20. The multiplexer 52 is controlled by a select signal which may be manually controlled. The multiplexer 52 is, effectively, an output selector switch by which the fill circuit may be selectively incorporated into the data stream or bypassed if the interpolated data is not desired.

In operation, the image memory 14 is scanned on a line by line basis. Before each cycle of data is loaded into the image memory, that memory is controlled to clear all addresses or pixels to zero. The data received from the A to D converter 8 through the buffer 10 and the coder 12 are loaded into the assigned addresses in the image memory 14 under the control of the array processor 16. As before noted, the data received from the transducer and converted by the A to D converter is limited by the coder 12 to a minimum value of one on a scale of zero to 15 corresponding to the relative intensity of the signal received by the transducer.

The signals received by the transducer are serial strings of data arranged in a succession of spaced radial lines. The array processor 16 is arranged to store the received data in the image memory 14 in the pattern corresponding to those spaced radial lines. The minimum value for the signals in any of the spaced radial lines will be a value of one on a scale of zero to 15. The pixels or data units in the memory between the spaced radial lines will contain logical zeros as will the data lying beyond the two edges of the fan shaped data area. When that data is read out of the image memory 14 in a line-by-line scanning order, the number of zero value in pixels between successive non-zero valued pixels are detected and accounted by the zero data counter 32 and stored in the zero count portion of the FIFO memory 30. The value of the data on a scale of zero to fifteen read from the image memory is stored directly into the gray data portion of the FIFO memory unit 30. The FIFO memory unit 30 is an asynchronous memory unt.

The zero count data is read into the preset counter 40 while the gray data is read simultaneously into the old value register 34 and the summer 36. From the edge of the display to the beginning of the fan shaped array, the gray data will be all zeros. It has been determined that in the radial line array of data there will be less than eight successive zeros between any two non-zero pixels in the data display. Therefore any succession of zeros counting eight or more is indicative of the presence of a true zero value. The eight or more zeros is recognized by the preset counter 40 and decoded by the decoder 22 to set the multiplexor 46 to read the old value, i.e., zero from the register 34, bypassing the interpolation. When the far edge of the fan shaped display has been reached, there will again be a number of zeros in excess of eight detected. Again the multiplexer will be actuated to read the last active data from the old value register 34 without interpolation to the zero level. This will, of course, be followed by all zeros from the register 34.

In the portion of the image memory in which the significant data is stored, the successive data values on each scan line are subtracted in the summer 36 to provide a value equal to the difference in intensity between the two successive data points on the scan line. The distance between those two data points is measured by the number of consecutive zeros counted by the zero data counter and transmitted through the FIFO 30. The objective of the interpolation system is to determine the magnitude of the difference between adjacent significant data bits, to divide that value by the distance between successive significant data cells, or pixels to produce a fractional value and to sum that fractional value with the last preceding value to produce a graduated transition between actual measured values over the space between measured values. To this end, when the leading edge of the fan shaped array is reached by the scanning of the image memory, the first sigificant value is transferred from the output of the old value register 34 into the multiplexer 46 and thence to the register 48.

The difference between that old value and the next significant non-zero value is determined by the summer 36. The distance between successive non-zero values is determined by the zero data counter 32 and transmitted through the FIFO 30 to the second input of the ROM 38. The data stored in the ROM 38 is a table of fractional values representing possible gray scale values on a scale of one to fifteen divided by zero count numbers of one to eight. The one to eight divisors represents the actual count of zeros, plus one, since the number of samples to fill the spaces between adjacent non-zero values is one less than the actual count number. This principle is illustrated in counting the spaces between a predetermined number of pickets in a picket fence, the spaces being one less than the number of pickets. Accordingly, the difference signal from the summer 36 and the zero count number from the zero count portion of the FIFO memory unit 30 applied to the input of the ROM 38 select a value at an address determined by the two input signals which is the value representative of the difference signal divided by the count number plus one. That fractional value output from the ROM 38 is summed in the summer 44 with the previous value taken from the output of the register 48. The output of the summer 44 is then applied through the multiplexer 46 to the input of the register 48 where the value stored is now the previous value plus the fractional increment. That value is then applied through the multiplexer 52 to the digital-to-analog converter, thence to the display and recording apparatus. The new value in the register 48 is now returned to the summer 48 where it is again summed with the increment and again returned to the register and applied through the multiplexer 52 to the digital-to-analog converter. This process is continued until the desired number of increments have been added and a new non-zero value is received from the gray data portion of the FIFO memory 30. In this manner, the values corresponding to differing shades of gray between adjacent non-zero values of the gray data received into the FIFO 30 are properly interpolated to provide a fill for the spaces between the radial lines of the image scan. These values are then clocked out of the register 48 by the dot clock 50 at a rate corresponding to the frequency of the individual dot elements on the CRT devices.

When the next non-zero value from the gray data portion of the FIFO memory 30 is received at the output thereof, the old value register is updated to store the last previous value and is then compared with the new value of the non-zero gray data. The interpolation process is then repeated for these two values and each successive pair of values across each line scan of the image memory. In this manner, the displayed or recorded image resulting from the interpolation presents a more readable and more esthetically pleasant image than the disconnected samples represented in FIG. 3 hereof. If, for any reason, it is desired to not use the filled or interpolated image, a select signal is applied to the multiplexer 52 to transmit the data directly from the image memory to the digital-to-analog converter 20 thence onto the display 24 to produce an image such as that shown in FIG. 3.

Thus, there has been provided, in accordance with the present invention, an improved image display and recording apparatus wherein the data between scanned samples are interpolated to provide a filled or smoothed resultant image. This is particularly desirable in the display and/or recording of medical diagnostic images.

The embodiments of the invention in which an exclusive property or privilege is claimed are defined as follows:

1. Interpolating means for interpolating between successive units of significant digital data signals in a data stream separated by a number of data spaces, said interpolating means comprising:

first means for determining the magnitude of the difference between successive units of significant digital data and for producing a corresponding digital difference signal;

second means for determining the number of consecutive data spaces between successive units of significant digital data and for producing a corresponding digital space signal;

third means connected to said first means and said second means to be responsive to said difference signal and said space signal to produce a digital fraction value signal representing a corresponding fractional portion of said difference signal;

means for sequentially incrementing said successive significant digital data signals in said data stream with said digital fractional value signal in accordance with said digital data space signal whereby to provide incremented value signals corresponding in number to the respective digital data space signals; and means for introducing said incremented value signals seriatim between adjacent ones of said significant digital data signals to provide an interpolated digital data signal stream.

2. Interpolating means as set forth in claim 1 wherein said first means comprises a digital summing circuit means for deriving said digital difference signal.

3. Interpolating means as set forth in claim 2 wherein said first means further includes circuit means for connecting a current significant digital data signals to a first input of said summing circuit means and an old value register means for temporary storage of an immediately previous significant digital data signal, said register means having an output connected to a second input of said summing circuit means whereby said summing circuit is operative to compare said current significant digital data signal with said signal stored in said old value register and to provide an output difference signal.

4. Interpolating means as set forth in claim 1 wherein said second means includes means for detecting said data spaces and counter means for determining said number of data spaces.

5. Interpolating means as set forth in claim 3 wherein said second means includes means for detecting said data spaces and counter means for counting the number of said data spaces between said successive significant digital signals.

6. Interpolating means as set forth in claim 5 wherein said third means comprises an addressable storage means having stored therein a table of digital fractional values, individual ones of said fractional values being addressable by said digital difference signal and said digital space signal to select from said table said corresponding fractional portion of said difference signal.

7. Interpolating means as set forth in claim 6 further including an output register means having an input and an output circuit means, and wherein said means for sequentially incrementing comprises an incrementing digital summing means having a first input connected to the output of said addressable storage means, an output connected to said input of said output register means, said output of said register means being connected to a second input of said incrementing digital summing means whereby to sequentially sum the output signal from said output register with said corresponding fractional portion of said difference signal between said successive units of significant digital data signals in said data stream.

8. Image data display apparatus comprising:

means for transmitting and, after a time period, receiving reflected pulsed analog image data signal;

means for converting said analog image data signals to significant digital image data signals;

memory means for storing said significant digital image data signals in a predetermined array in said memory means in which successive units of said significant digital image data signals are separated by a number of data spaces such number varying with the time period;

circuit means including digital interpolating means for providing a number of interpolative digital fractional value signals in said data spaces between said successive units of significant digital image data signals the number of said interpolative fractional value signals being a function of the number of said data spaces;

said circuit means further including means for converting the significant digital image data signals and said interpolative digital fractional value signals from said interpolating means to output analog signals; and means for controlling the Z-axis modulation of an image display apparatus in accordance with said output analog signals.

9. Image data display apparatus as set forth in claim 8 wherein said interpolating means comprises:

first means for determining the magnitude of the difference between successive units of significant digital image data and for producing a corresponding digital difference signal;

second means for determining the number of consecutive data spaces between successive units of significant digital image data and means for producing a corresponding digital space signal;

third means connected to said first means and said second means to be responsive to said difference signal and said space signal to produce a digital fractional value signal representing a corresponding fractional portion of said difference signal;

means for sequentially incrementing said successive significant digital image data signals with said digital fractional value signals in accordance with said digital data space signal whereby to provide incremented value signals corresponding in number to said digital data space signals; and means for introducing said incremented value signals seriatim between adjacent ones of said significant digital image data signals.

10. Image data display means as set forth in claim 9 wherein said third means comprises an addressable storage means having stored therein a table of digital fractional values, individual ones of said fractional values being addressable by said digital difference signal and said digital space signal to select from said table said corresponding fractional portion of said difference signal.

* * * * *